Patented Dec. 8, 1953

2,662,100

UNITED STATES PATENT OFFICE 2,662,100

PURIFICATION OF SODIUM ALCOHOLATES

Eugene F. Hill, Detroit, Mich., assignor to Ethyl Corporation, New York, N. Y., a corporation of Delaware No Drawing. Application June 29, 1951, Serial No. 234,457

8 Claims. (Cl. 260—643)

This invention relates to removing hydroxy ions in the form of sodium hydroxide and water from a mixture of alcohol, sodium alcoholate, sodium hydroxide and water.

Sodium alcoholates are important industrial chemicals and generally are made by reacting sodium with an anhydrous alcohol. This process gives a good alcoholate product of high purity and free of undesirable hydroxy ions but it is expensive due to the use of metallic sodium. Other processes have produced alcoholates by reacting caustic, which is relatively cheap, with an alcohol but have not been entirely successful due to the difficulty of removing the hydroxy ions present in the alcoholate product. The same is true of the alcoholate process disclosed in U. S. Patent 2,543,407.

In both of the last mentioned processes I had the difficult problem of removing hydroxy ions from a mixture of alcohol, sodium alcoholate, caustic and water. An object of this invention is to provide an economical method for reducing the hydroxy ion concentration in such mixtures to below one per cent which is the maximum tolerated in commercial alcoholate products.

I accomplish this and other objects by treating such mixtures with silicon or metal silicides such as the silicides of iron, calcium, titanium and zirconium. It is the silicon, and this is true when a silicide is employed, which removes the hydroxy ions by precipitation of alcohol insoluble silicon compounds as may be expressed by the following equation:

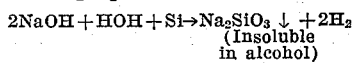

(Insoluble in alcohol)

While pure silicon can be successfully employed I prefer to use silicon in the cheaper form of a metal silicide, the metal of which also removes some of the hydroxy ions in the form of alcohol insoluble hydroxides. Thus not only are the metal silicides cheaper than pure silicon, but the metal actually aids in removing hydroxy ions. Among the silicides previously mentioned I particularly prefer to use a ferrosilicide having a silicon content between 50 per cent and 95 per cent.

To adequately remove the hydroxy ions from such alcoholate mixtures, from two to ten times the stoichiometric amount of silicon must be used. The temperature employed is not critical and good results are obtained at the reflux temperature of the alcohol in the mixture.

My invention can be best understood by referring to the following working example in which the parts and percentages are by weight.

Example

To a suitable container provided with suitable heating means and a reflux condenser were added 200 parts of a mixture comprising 90.5 per cent of methyl alcohol, 6.9 per cent of sodium methylate, and 2.6 per cent of hydroxy ions in the form of water and sodium hydroxide but expressed here- in as sodium hydroxide. To this mixture were added 25 parts of ferrosilicon (90-95 per cent silicon, 20-40 U. S. Standard mesh) and the entire mixture refluxed at the temperature of the reflux temperature of methyl alcohol for a period of 25 hours. At the end of this period the alcoholate product was anaylzed and found to contain less than 0.2 per cent of hydroxy ions which is well below the commercial, acceptable limit.

In other operations using silicon, calcium silicide, titanium silicide and zirconium silicide instead of the ferrosilicide in the above example, good results are also obtained. By my process ions are also readily removed from alcoholate mixtures other than sodium methylate such as from sodium ethylate, sodium propylate, sodium butylate and the like. Of course the corresponding aliphatic alcohols were also present.

I claim:

1. A method for removing hydroxy ions from a mixture containing an alcohol, a sodium alcoholate, sodium hydroxide and water comprising treating said mixture with from 2 to 10 times the stoichiometric amount of a material selected from the group consisting of silicon, iron silicide, calcium silicide, titanium silicide, and zirconium silicide.

2. The method of claim 1 using silicon.

3. The method of claim 1 using a ferrosilicide.

4. The method of claim 1 using a calcium silicide.

5. The method of claim 1 using a titanium silicide.

6. The method of claim 1 using a zirconium silicide.

7. The method of claim 1 using a ferrosilicide having a silicon content between 50 and 95 per cent.

8. A method for removing hydroxy ions from a mixture containing an alcohol, a sodium alcoholate, sodium hydroxide and water comprising treating said mixture with from 2 to 10 times the stoichiometric amount of a material selected from the group consisting of silicon, iron silicide, calcium silicide, titanium silicide, and zirconium silicide, said treatment being conducted under reflux conditions at substantially the reflux temperature of the alcohol contained in said mixture and at substantially atmospheric pressure of the reacting mixture.

EUGENE F. HILL.

References Cited in the file of this patent

UNITED STATES PATENTS

| Number | Name | Date |
|---|---|---|
| 2,084,419 | Wallis | June 22, 1937 |
| 2,287,088 | Cohen | June 23, 1942 |
| 2,445,576 | Haber | July 20, 1948 |

OTHER REFERENCES

Thorpe's Dictionary of Applied Science, 4th ed., vol. 6, page 330 (1943).